United States Patent
Chung et al.

(10) Patent No.: US 12,372,973 B2
(45) Date of Patent: Jul. 29, 2025

(54) MOBILE BODY AND METHOD FOR CONTROLLING SAME

(71) Applicants: HYUNDAI MOTOR COMPANY, Seoul (KR); KIA CORPORATION, Seoul (KR); MOBINN INC., Suwon-si (KR)

(72) Inventors: Hoon Chung, Hwaseong-si (KR); Jin Choi, Seoul (KR); Sun Myoung Jo, Ansan-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 237 days.

(21) Appl. No.: 18/451,413

(22) Filed: Aug. 17, 2023

(65) Prior Publication Data
US 2024/0319730 A1    Sep. 26, 2024

(30) Foreign Application Priority Data
Mar. 21, 2023   (KR) .......................... 10-2023-0036849

(51) Int. Cl.
G05D 1/00    (2024.01)
(52) U.S. Cl.
CPC .................................. G05D 1/0891 (2013.01)
(58) Field of Classification Search
CPC .... G05D 1/0891; G05D 2111/50; B62B 9/02; B60G 2400/052
See application file for complete search history.

(56) References Cited

U.S. PATENT DOCUMENTS

| | | | | |
|---|---|---|---|---|
| 2003/0183427 A1* | 10/2003 | Tojo | ..................... | A61G 5/1051 180/8.1 |
| 2008/0266254 A1* | 10/2008 | Robbins | .................. | G05G 1/04 345/161 |
| 2010/0084204 A1* | 4/2010 | Iwaki | ................... | B62D 55/075 180/9.52 |
| 2010/0305840 A1* | 12/2010 | Doi | ...................... | B62K 11/007 701/124 |
| 2011/0260417 A1* | 10/2011 | Bitzer | .................... | A61G 5/061 280/5.2 |

(Continued)

FOREIGN PATENT DOCUMENTS

| | | |
|---|---|---|
| CN | 108445896 | 8/2018 |
| CN | 109677507 | 4/2019 |

(Continued)

*Primary Examiner* — Naeem Taslim Alam
(74) *Attorney, Agent, or Firm* — Fish & Richardson P.C.

(57) ABSTRACT

A mobile body includes a body, a front wheel and a rear wheel rotatably coupled to the front side and the rear side of the body respectively, a front wheel driving unit and a rear wheel driving unit coupled to the body and the front wheel and the rear wheel to transmit a driving force to the front wheel and the rear wheel respectively, a body angle acquisition unit to acquire a degree at which the body is tilted, and a processor. When a forward movement signal is input, the processor controls the front wheel driving unit so that when an inclination of the body to the ground is greater than a forward movement inclination threshold, the front wheel rotates at a speed based on a control value corresponding to an angular velocity of the body. As the angular velocity increases, the control value decreases.

20 Claims, 11 Drawing Sheets

(56) References Cited

U.S. PATENT DOCUMENTS

| | | | |
|---|---|---|---|
| 2014/0116792 A1* | 5/2014 | Ueda | A61G 5/061 |
| | | | 180/8.3 |
| 2018/0162705 A1* | 6/2018 | Kubotani | B66F 17/003 |
| 2019/0094874 A1* | 3/2019 | Ogawa | G05D 1/027 |
| 2023/0047500 A1* | 2/2023 | Lafontaine | B62D 51/04 |

FOREIGN PATENT DOCUMENTS

| | | |
|---|---|---|
| JP | 5432688 | 3/2014 |
| JP | 7038352 | 3/2022 |
| JP | 7125236 | 8/2022 |
| KR | 10-2006-0002682 | 1/2006 |
| KR | 10-1216804 | 12/2012 |
| KR | 10-2024-0053328 | 4/2024 |

* cited by examiner

MOBILE BODY AND METHOD FOR CONTROLLING SAME

CROSS-REFERENCE TO RELATED APPLICATION(S)

This application claims priority from and the benefit of Korean Patent Application No. 10-2023-0036849, filed on Mar. 21, 2023, which is hereby incorporated by reference for all purposes as if set forth herein.

TECHNICAL FIELD

Exemplary implementations relate to a mobile body and a method for controlling same.

BACKGROUND

Autonomous mobile robots should be able to overcome various terrains, such as stairs and bumps, as well as simple flat surfaces. In the case of mobile bodies using wheels rather than humanoid robots, it can be difficult to overcome various terrains when the mobile bodies travel in a similar manner in which normal vehicles are controlled and moved.

When a mobile body using wheels goes up or down stairs, if the wheels are driven at a constant speed, the wheels collide quickly with the stairs every time the wheels cross the stairs, and a large amount of impact may be applied to the moving body.

SUMMARY

Exemplary implementations of the present disclosure provide a mobile body, which is controlled not to collide strongly with stairs when moving along the stairs, and a method for controlling same.

A first exemplary implementation of the present disclosure provides a mobile body including: a body; a front wheel rotatably coupled to the front side of the body; a rear wheel rotatably coupled to the rear side of the body; a front wheel driving unit coupled to the body and the front wheel to transmit a driving force to the front wheel; a rear wheel driving unit coupled to the body and the rear wheel to transmit a driving force to the rear wheel; a body angle acquisition unit installed on the body to acquire a degree at which the body is tilted; and a processor electrically connected to the body angle acquisition unit, the front wheel driving unit, and the rear wheel driving unit, wherein when a forward movement signal is input, the processor controls the front wheel driving unit so that when an inclination of the body to the ground acquired by the body angle acquisition unit is greater than a certain forward movement inclination threshold, the front wheel rotates at a speed based on a control value corresponding to an angular velocity of the body calculated from information acquired by the body angle acquisition unit, wherein in at least a range, as the angular velocity of the body increases, the control value corresponding to the angular velocity of the body decreases.

A second exemplary implementation of the present disclosure provides a method for controlling a mobile body that is provided with a body and front and rear wheels rotatably coupled to respective front and rear sides of the body, the method including: acquiring an inclination of the body to the ground; calculating an angular velocity of the body from the inclination of the body to the ground; and rotating the front wheel at a speed based on a control value corresponding to the angular velocity of the body when a forward movement signal is input and the inclination of the body to the ground is greater than a certain forward movement inclination threshold, wherein in at least a range, as the angular velocity of the body increases, the control value corresponding to the angular velocity of the body decreases.

BRIEF DESCRIPTION OF THE DRAWINGS

The accompanying drawings, which are included to provide a further understanding of the disclosure and are incorporated in and constitute a part of this specification, illustrate implementations of the disclosure, and together with the description serve to explain the principles of the disclosure.

DETAILED DESCRIPTION

Hereinafter, exemplary implementations of the present disclosure are described in more detail with reference to the accompanying drawings. When reference numerals are given to elements in each drawing, it should be noted that the same elements are designated by the same reference numerals if possible although they are shown in different drawings. Also, in describing exemplary implementations of the present disclosure, a detailed description of related known configurations or functions is omitted when it is determined that the understanding of the exemplary implementations of the present disclosure is hindered by the detailed description.

Figure 1:
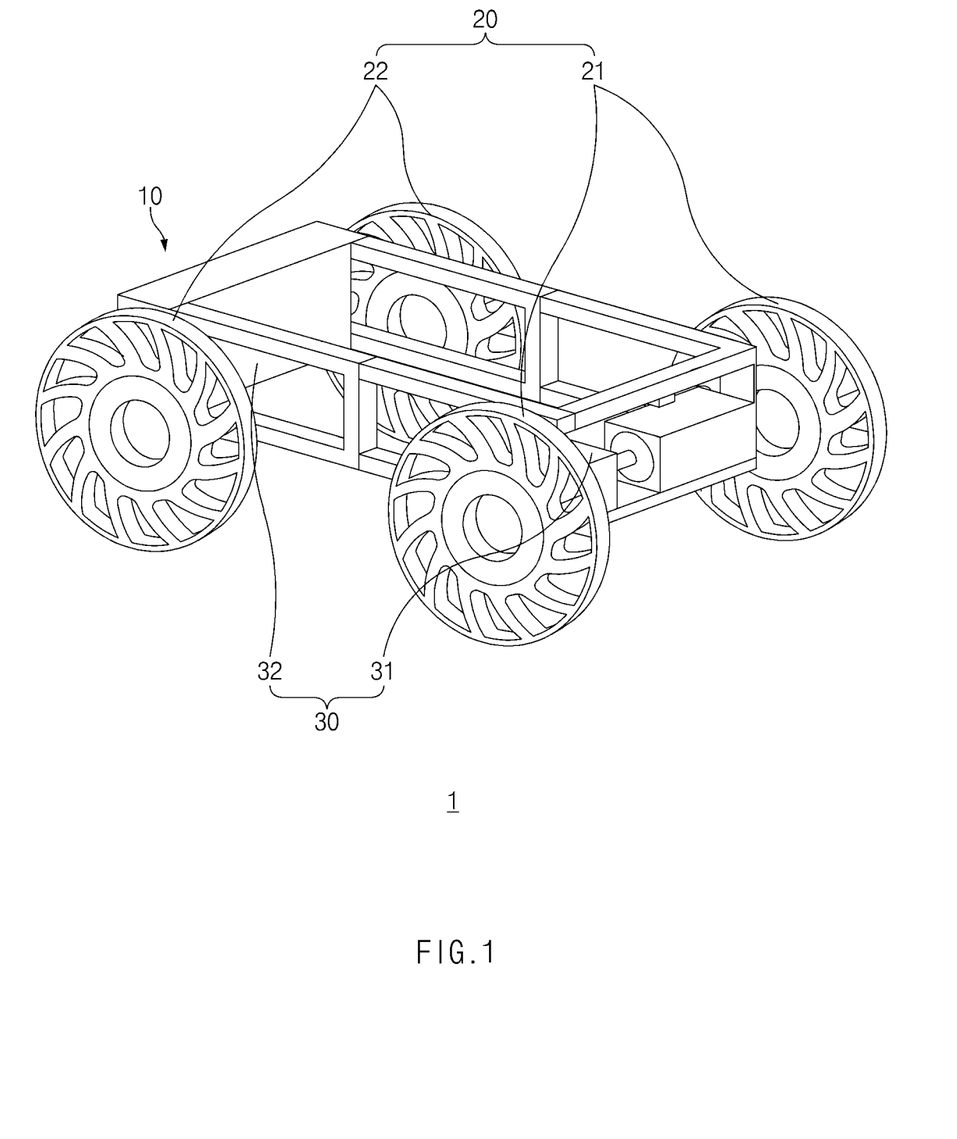
FIG. 1 is a perspective view of a mobile body according to an exemplary implementation of the present disclosure.

FIG. 1 is a perspective view of a mobile body 1 according to an exemplary implementation of the present disclosure.

Referring to the drawing, the mobile body 1 according to an exemplary implementation of the present disclosure includes a body 10 and wheels 20. The wheels 20 include a front wheel 21 and a rear wheel 22. The mobile body 1 includes a wheel driving unit 30 for driving each of the wheels 20. The wheel driving unit 30 includes a front wheel driving unit 31 and a rear wheel driving unit 32. The mobile body 1 includes an angle acquisition unit and a processor.

As used herein, the front, rear, left, right, up, and down directions are referred to for convenience of description, and these directions may be determined relative to the directions in which the mobile body 1 is located. The front-rear direction, left-right direction, and up-down direction may be perpendicular to each other.

The wheel 20 may be rotatably coupled to the body 10. A robot 40 capable of performing various tasks may be coupled to the body 10. The robot 40 may be placed on the body 10. The body 10 moves according to the driving of the wheels 20, and the robot 40 moves according to the movement of the body 10. Subsequently, the robot 40 may perform the tasks. The robot 40 may be coupled to the front side of the body 10.

The front wheel 21 may be rotatably coupled to the front side of the body 10. A pair of front wheels 21 may be respectively arranged on the left and right sides of the front side of the body 10. The rear wheel 22 may be rotatably coupled to the rear side of the body 10. A pair of rear wheels 22 may be respectively arranged on the left and right sides of the rear side of the body 10.

The front wheel driving unit 31 may be coupled to the body 10 and the front wheels 21 to transmit driving force to the front wheels 21. Therefore, a pair of front wheel driving units 31 may also be provided and coupled to the respective front wheels 21. The front wheel driving unit 31 may receive power and generate the driving force. Accordingly, the front wheel driving unit 31 may include a motor, but a device included in the front wheel driving unit 31 is not limited thereto as long as the device may generate driving force.

The rear wheel driving unit 32 may be coupled to the body 10 and the rear wheels 22 to transmit driving force to the rear wheels 22. Therefore, a pair of rear wheel driving units 32 may also be provided and coupled to the respective rear wheels 22. The rear wheel driving unit 32 may receive power and generate the driving force. Accordingly, the rear wheel driving unit 32 may include a motor, but a device included in the rear wheel driving unit 32 is not limited thereto as long as the device may generate driving force.

An angle acquisition unit of the body 10 is installed on the body 10 to acquire a degree at which the body 10 is tilted. The angle acquisition unit of the body 10 may include a gyro sensor, an acceleration sensor, or the like to acquire the degree at which the body 10 is tilted, but a device included in the angle acquisition unit of the body 10 is not limited thereto as long as the device may acquire the degree at which the body 10 is tilted.

The processor is electrically connected to the angle acquisition unit of the body 10, the front wheel driving unit 31, and the rear wheel driving unit 32. The processor may be coupled to the body 10, but may also be included in the robot 40.

The processor is provided so as to control the mobile body 1. The processor may include a central processing unit (CPU) and the like as components including elements capable of logic operations for performing control commands. The processor may be connected to various components and transmit a signal according to a control command to each of the components to control the component, and may be connected to various sensors or acquisition units and receive acquired information in the form of a signal. Accordingly, in an exemplary implementation of the present disclosure, the processor may be electrically connected to various components included in the mobile body 1. The processor may be electrically connected to each of components, and thus, the processor may communicate with the components by being connected to the components via wires or by further including a communication module capable of wireless communication.

The mobile body 1 according to an exemplary implementation of the present disclosure further includes a storage medium, and thus, control commands executed by the processor may be stored in the storage medium and utilized. The storage medium may include devices, such as a hard disk drive (HIDD), a solid state drive (SSD), a server, a volatile medium, and a nonvolatile medium, but the types of the storage medium are not limited thereto. In addition, data required for the processor to perform tasks may be further stored in the storage medium.

Figure 2:
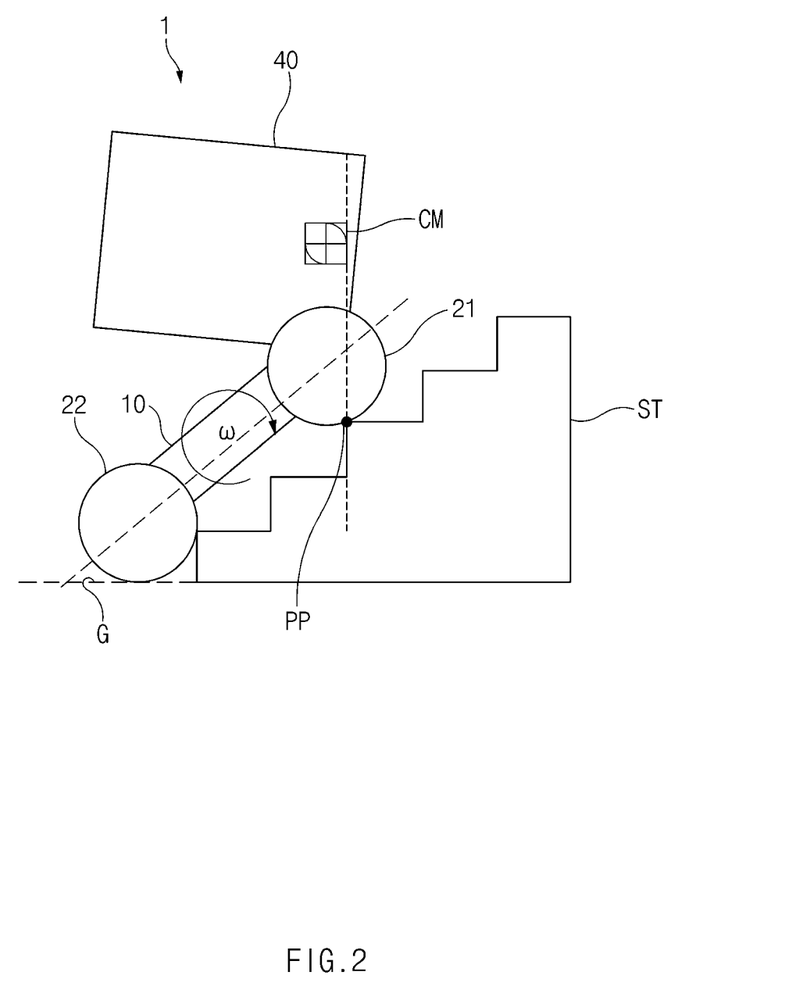
FIG. 2 is a conceptual view illustrating a state in which the center of mass of a mobile body according to an exemplary implementation of the present disclosure does not pass a pivot point while going up stairs.
Figure 3:
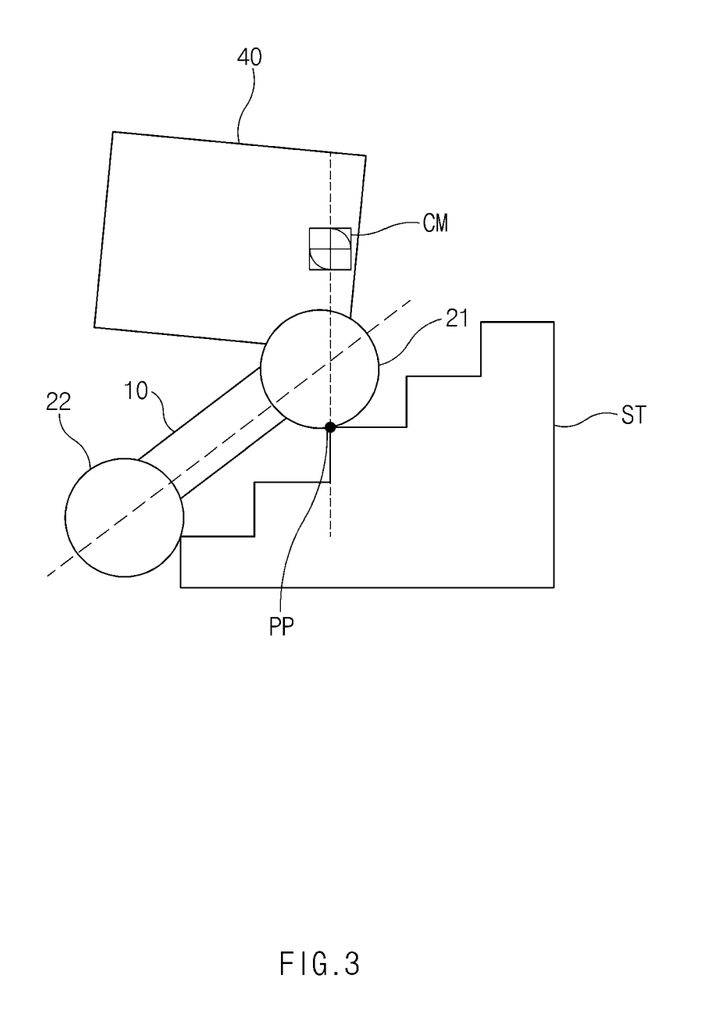
FIG. 3 is a conceptual view illustrating a state in which the center of mass of a mobile body according to an exemplary implementation of the present disclosure is positioned at a pivot point while going up stairs.
Figure 4:
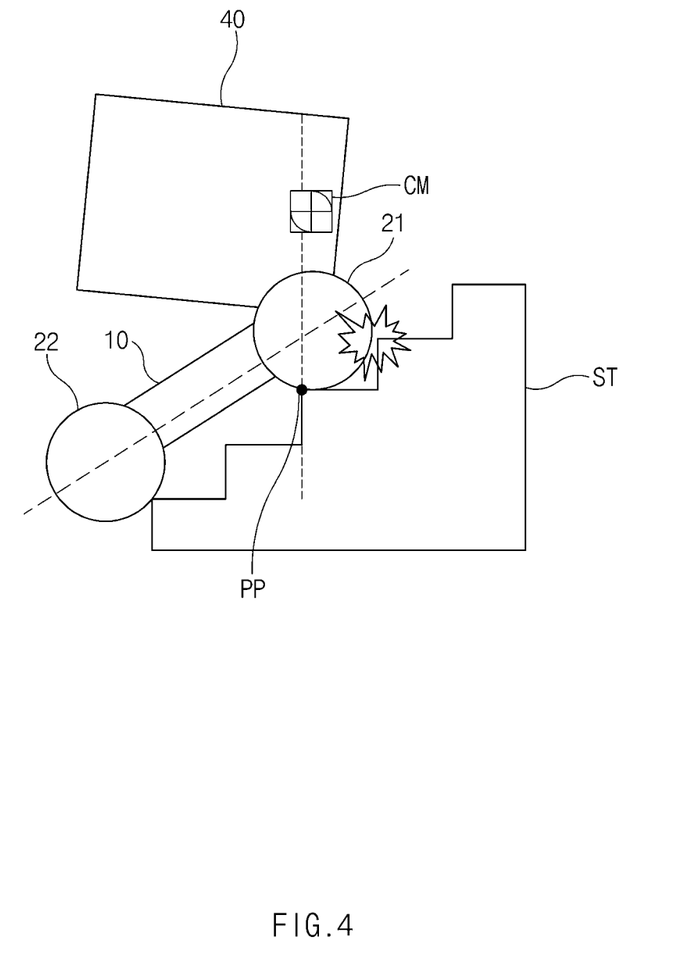
FIG. 4 is a conceptual view illustrating a state in which the center of mass of a mobile body according to an exemplary implementation of the present disclosure passes a pivot point while going up stairs.
Figure 5:
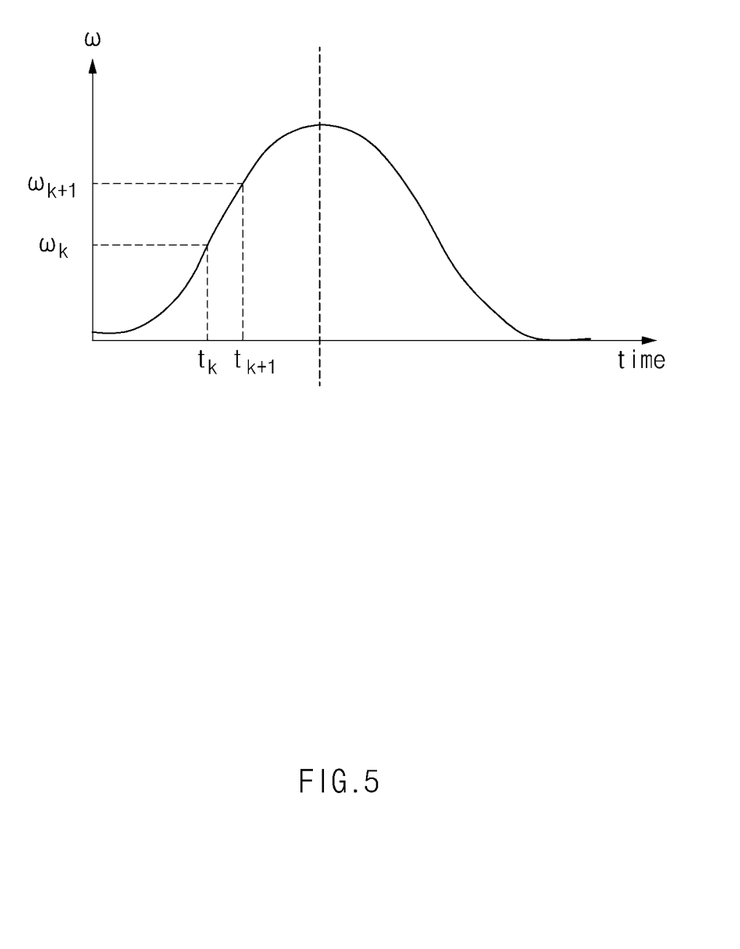
FIG. 5 is a graph showing over time an angular velocity of a mobile body according to an exemplary implementation of the present disclosure when the mobile body goes up stairs.
Figure 6:
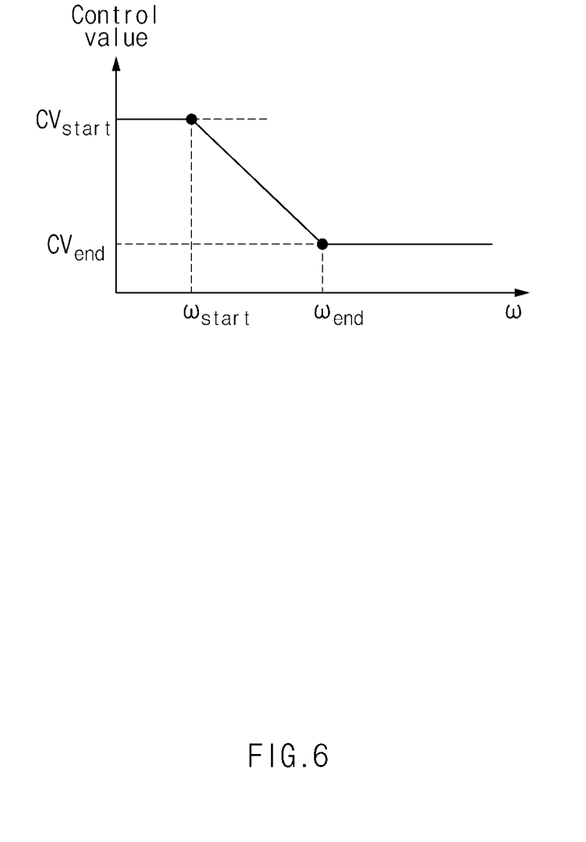
FIG. 6 is a graph representing an angular velocity and a control value corresponding thereto of a mobile body according to an exemplary implementation of the present disclosure.
Figure 7:
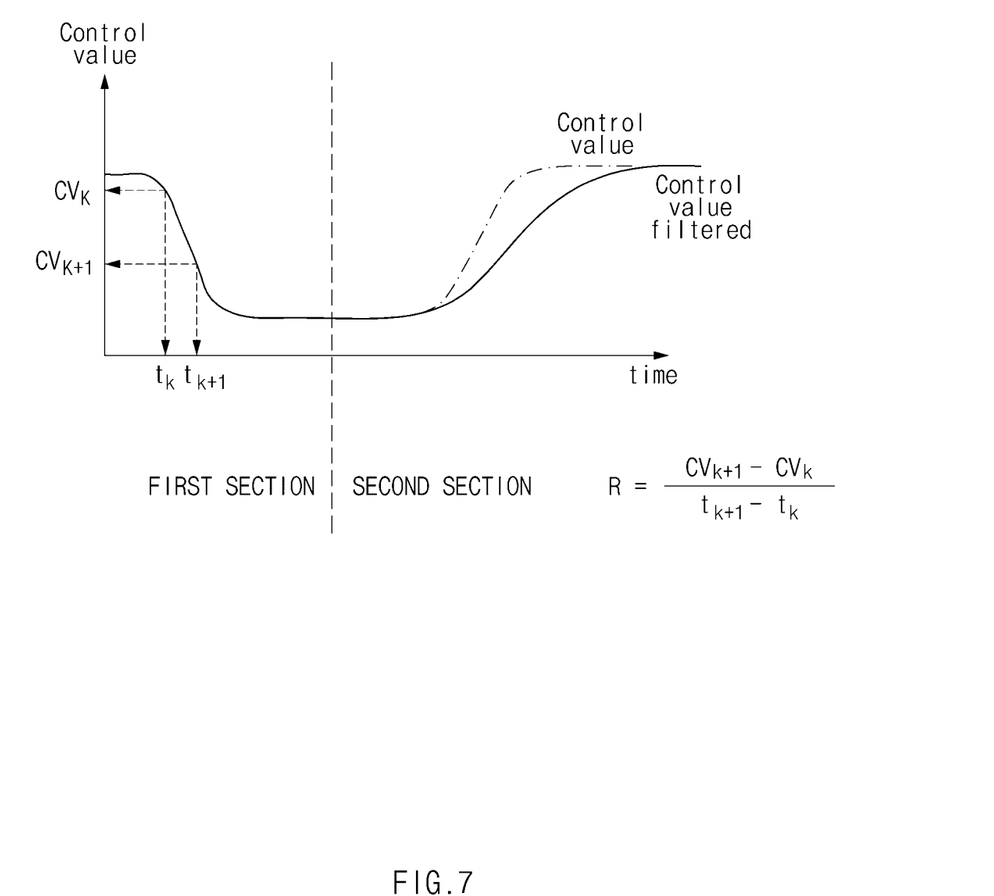
FIG. 7 is a graph representing a control value over time when a mobile body according to an exemplary implementation of the present disclosure goes up stairs.

FIG. 2 is a conceptual view illustrating a state in which a center of mass CM of a mobile body 1 according to an exemplary implementation of the present disclosure does not pass a pivot point PP while going up stairs ST. FIG. 3 is a conceptual view illustrating a state in which the center of mass CM of the mobile body 1 according to an exemplary implementation of the present disclosure is positioned at the pivot point PP while going up the stairs ST. FIG. 4 is a conceptual view illustrating a state in which the center of mass CM of the mobile body 1 according to an exemplary implementation of the present disclosure passes the pivot point PP while going up the stairs ST. FIG. 5 is a graph showing over time an angular velocity of the mobile body 1 according to an exemplary implementation of the present disclosure when the mobile body 1 goes up the stairs ST. FIG. 6 is a graph representing an angular velocity and a control value corresponding thereto of the mobile body 1 according to an exemplary implementation of the present disclosure. FIG. 7 is a graph representing a control value over time when the mobile body 1 according to an exemplary implementation of the present disclosure goes up the stairs ST.

Referring to the drawings, the mobile body 1 according to an exemplary implementation of the present disclosure may move forward in response to a forward movement signal and go up the stairs ST. When going up the stairs ST, the center of mass CM of the entire mobile body 1 including the robot 40 may be positioned behind the pivot point PP at which the front wheel 21 contacts a stair ST as shown in FIG. 2, the center of mass CM may pass the pivot point PP as shown in FIG. 3, and the center of mass CM may cross over to the front side of the pivot point PP as shown in FIG. 4. In this situation, the angular velocity of the body 10 over time may be shown in the graph of FIG. 5. The angular velocity of the body 10 shown in FIG. 5 is indicated as having a positive direction in the clockwise direction in FIGS. 2 to 4.

When passing the pivot point PP while moving forward, deceleration for the front wheel 21 has to be made. When the deceleration is not achieved, the front wheel 21 collides with a next stair ST as illustrated in FIG. 4. Also, in this situation, a large impact may be applied to the front wheel 21.

When a forward movement signal is input, the processor may control the front wheel driving unit 31 so that when an inclination of the body 10 to the ground G acquired by the angle acquisition unit of the body 10 is greater than a certain forward movement inclination threshold, the front wheel 21 rotates at a speed based on a control value corresponding to an angular velocity of the body 10 calculated from information acquired by the angle acquisition unit of the body 10. The forward movement inclination threshold may refer to an inclination of the body 10 to the ground G at the pivot point PP.

The inclination of the body 10 to the ground G refers to the angle between the ground G and a dotted line indicating the direction of the body 10 in FIG. 2. In at least a range, as the angular velocity of the body 10 increases, the control value corresponding to the angular velocity of the body 10 may decrease. The relationship between the angular velocity of the body 10 and the control value may be shown in the graph of FIG. 6. Here, the range mentioned above represents a range between a start control value and an end control value of FIG. 6. The control value may include a value between 0 and about 1, and a value obtained by multiplying the control value by the maximum rotation speed that the wheel 20 may have may be determined as a speed value of the wheel 20. That is, as the body 10 rotates intensively, the control value becomes lowered. Accordingly, the rotation speed of the wheel 20 is also reduced, and thus, the front wheel 21 may slowly and stably come into contact with a next stair ST.

When moving forward, the processor may calculate a rate of change of the control value over time and control the front wheel driving unit 31 so that when the calculated rate of change is greater than 0, the front wheel 21 rotates at a speed based on a value obtained by passing the control value through a flattening low-pass filter. A graph, which shows the control value passing through the flattening low-pass filter and the control value not passing through a low-pass filter, may be seen in FIG. 7. The low-pass filter is a filter for attenuating a signal having a frequency higher than a specific cut-off frequency. R in FIG. 7 represents the rate of change. A first section, which may be seen in the graph, represents the moment when passing through the pivot point PP as shown in FIG. 3, and a second section represents a situation just before the front wheel 21 comes into contact with a next stair ST as shown in FIG. 4. In the first section, deceleration occurs, and thus, the front wheel 21 may not strongly collide with the next stair ST.

In the second section, the calculated rate of change may be greater than 0 due to the angular velocity of the body 10 which has been reduced in the first section. The final control value obtained by passing the control value through the flattening low-pass filter increases more slowly than the control value not passing through the low-pass filter, and thus, the speed of the front wheel 21 gradually increases in the second section. Accordingly, the front wheel 21 may smoothly come into contact with the next stair ST while restricting the mobile body 1 from going up the next stair ST too slowly.

When moving forward, the processor may use a value, which is obtained by passing a control value through the noise-elimination low-pass filter, as a control value for calculating the rate of change. An attenuation frequency of the noise-elimination low-pass filter may be higher than an attenuation frequency of the flattening low-pass filter. The processor calculates the rate of change using the value from which noise has been removed, and thus, a more accurate rate of change may be calculated by clearing up control values from which it is difficult to consistently derive a trend of increase or decrease.

During moving forward, when the calculated rate of change is less than or equal to 0, the processor may control the front wheel driving unit 31 so that the front wheel 21 rotates at a speed based on a control value that has not passed through the flattening low-pass filter. That is, rapid deceleration may be required in the first section, but flattening of the control value is not necessary. Therefore, the control value that has not passed through the flattening low-pass filter may be used as the final control value.

Figure 8:
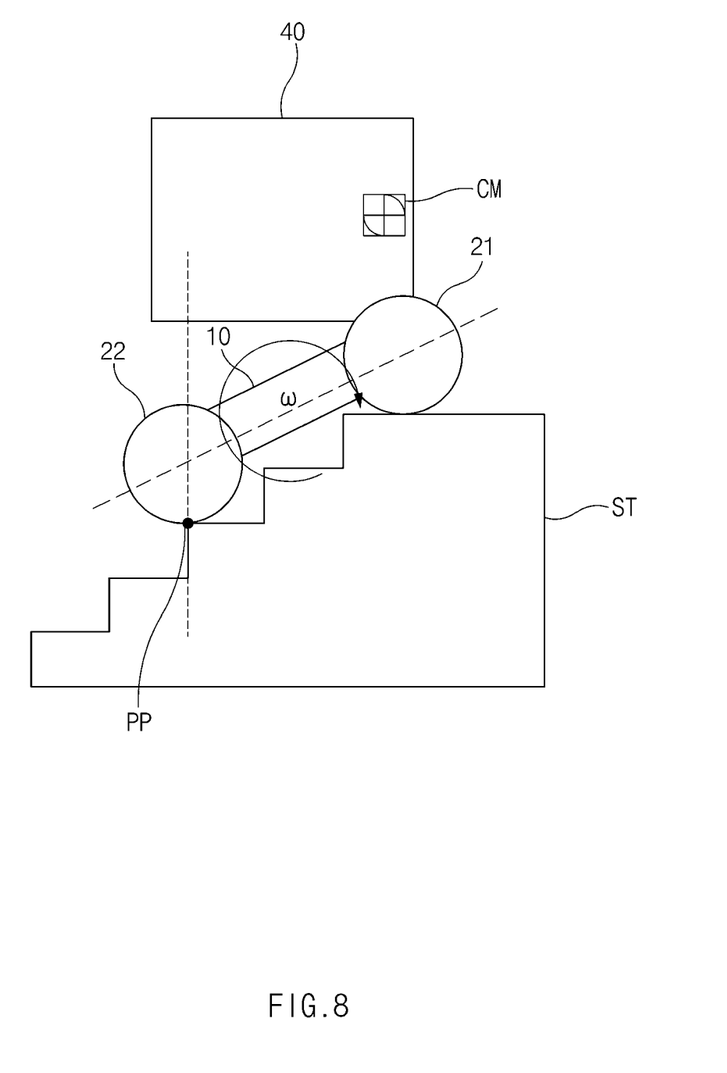
FIG. 8 is a conceptual view illustrating a state in which a mobile body according to an exemplary implementation of the present disclosure starts going down stairs.
Figure 9:
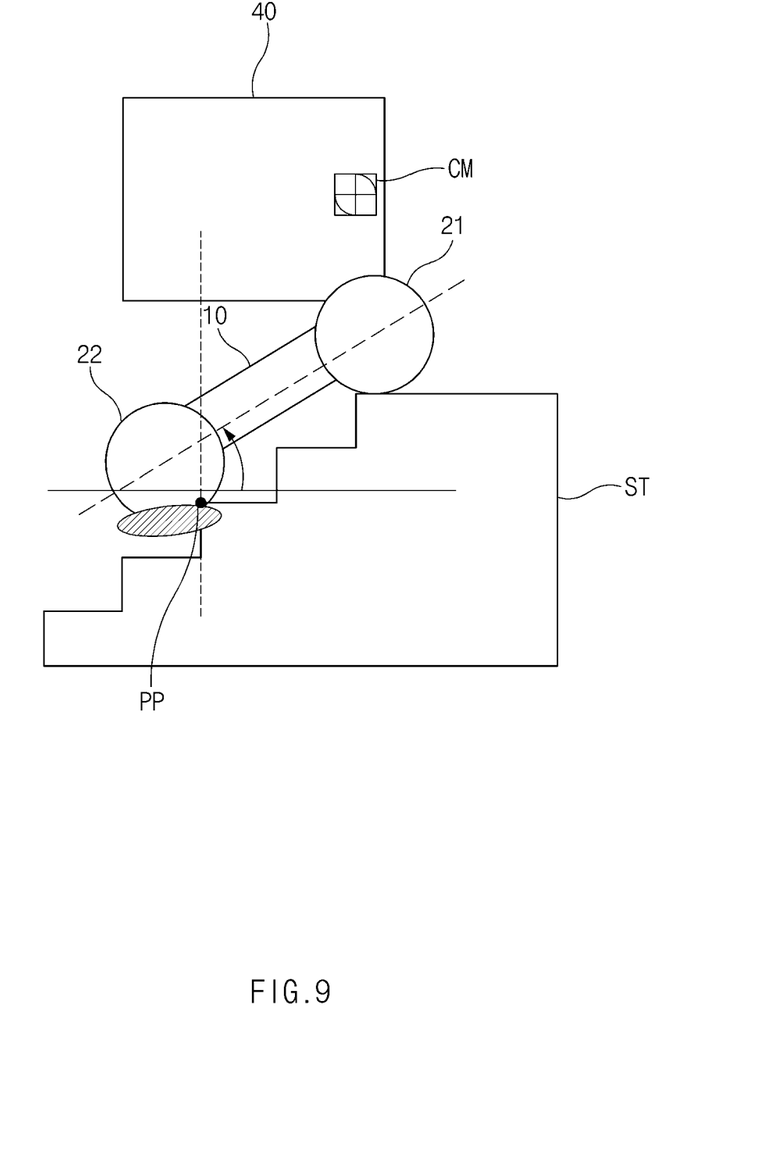
FIG. 9 is a conceptual view illustrating a state in which a mobile body according to an exemplary implementation of the present disclosure loses a support point while going down stairs.
Figure 10:
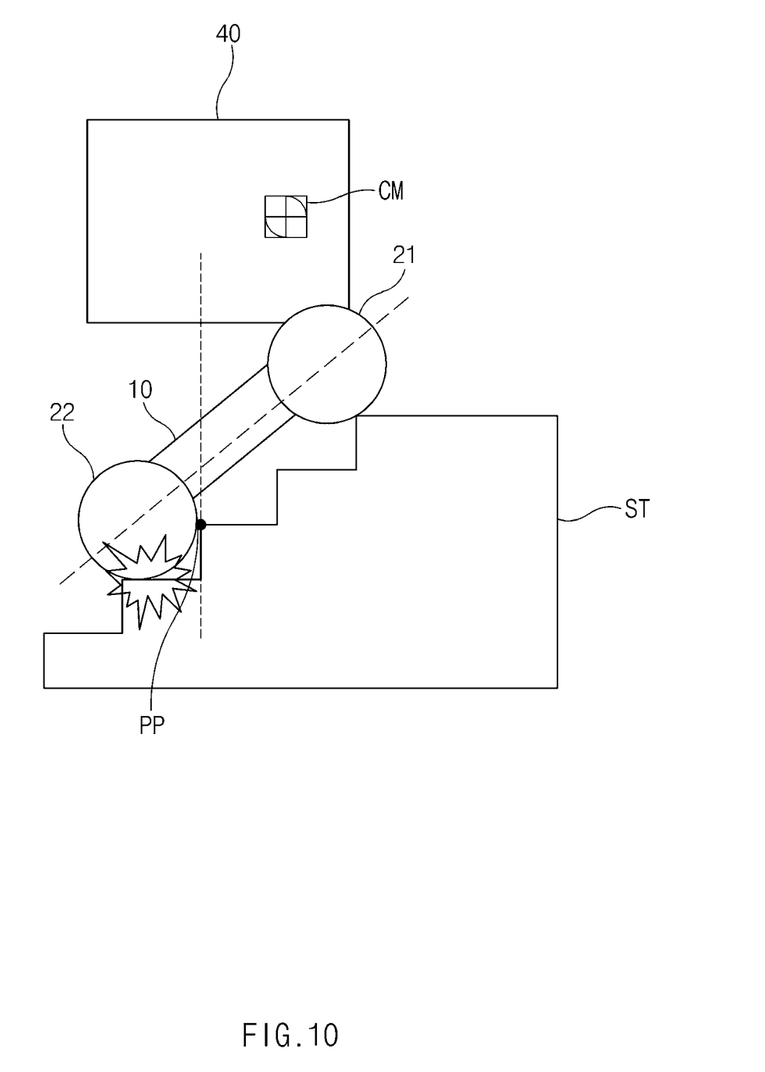
FIG. 10 is a conceptual view illustrating a state in which a mobile body according to an exemplary implementation of the present disclosure rests on stairs while going down the stairs.

FIG. 8 is a conceptual view illustrating a state in which the mobile body 1 according to an exemplary implementation of the present disclosure starts going down the stairs ST. FIG. 9 is a conceptual view illustrating a state in which the mobile body 1 according to an exemplary implementation of the present disclosure loses a support point while going down the stairs ST. FIG. 10 is a conceptual view illustrating a state in which the mobile body 1 according to an exemplary implementation of the present disclosure rests on the stairs ST while going down the stairs ST.

Referring to the drawings, the mobile body 1 according to an exemplary implementation of the present disclosure may move backward in response to a backward movement signal and go down the stairs ST. When going down the stairs ST, the mobile body 1 including the robot 40 may pass through the pivot point PP as shown in FIG. 8, lose the support point as shown in FIG. 9, and come into contact with a next stair ST as shown in FIG. 10.

When passing the pivot point PP while moving backward, deceleration for the rear wheel 22 has to be made. When the deceleration is not achieved, the rear wheel 22 collides with a next stair ST as illustrated in FIG. 10. Also, in this situation, a large impact may be applied to the rear wheel 22.

When a backward movement signal is input, the processor may control the rear wheel driving unit 32 so that the rear wheel 22 rotates at a speed based on a control value corresponding to an angular velocity of the body 10. As the body 10 rotates intensively, the control value becomes lowered. Accordingly, the rotation speed of the wheel 20 is also reduced, and thus, the rear wheel 22 may slowly and stably come into contact with the next stair ST.

When moving backward, the processor may calculate a rate of change of the control value over time and control the rear wheel driving unit 32 so that when the calculated rate of change is greater than 0, the rear wheel 22 rotates at the same speed as a value obtained by passing the control value through the flattening low-pass filter.

During moving backward, when the calculated rate of change is less than or equal to 0, the processor may control the rear wheel driving unit 32 so that the rear wheel 22 rotates at a speed based on a control value that has not passed through the flattening low-pass filter.

When moving backward, an attenuation frequency of the flattening low-pass filter may change according to the inclination of the body 10 to the ground G. This is because it can be necessary to control the mobile body 1 in different manners, when moving backward, between a case, in which the mobile body 1 is located at a beginning of the stair ST, and a case, in which the mobile body 1 is located in the middle of the stair ST. A degree, to which the flattening low-pass filter attenuates the control value when the mobile body 1 is located in the middle of the stair ST and the inclination of the body 10 to the ground G calculated from information acquired by the angle acquisition unit of the body 10 is greater than a certain backward movement inclination threshold, may be greater than a degree, to which the flattening low-pass filter attenuates the control value when the mobile body 1 is located at the beginning of the stair ST and the inclination of the body 10 to the ground G is less than or equal to the backward movement inclination threshold. That is, the attenuation frequency of the flattening low-pass filter when the inclination of the body 10 to the ground G is greater than the backward movement inclination threshold may be less than the attenuation frequency of the flattening low-pass filter when the inclination of the body 10 to the ground G is less than or equal to the backward movement inclination threshold. This is because it is necessary to bring the rear wheel 22 into contact with a next stair ST more smoothly as the degree at which the body 10 is tilted increases.

When moving rearward, the processor may use a value, which is obtained by passing a control value through the noise-elimination low-pass filter, as a control value for calculating the rate of change. An attenuation frequency of the noise-elimination low-pass filter may be higher than an attenuation frequency of the flattening low-pass filter.

The attenuation frequency of the flattening low-pass filter when moving forward may be different from the attenuation frequency of the flattening low-pass filter when moving backward. The attenuation frequency of the noise-elimination low-pass filter when moving forward may be different from the attenuation frequency of the noise-elimination low-pass filter when moving backward.

Figure 11:
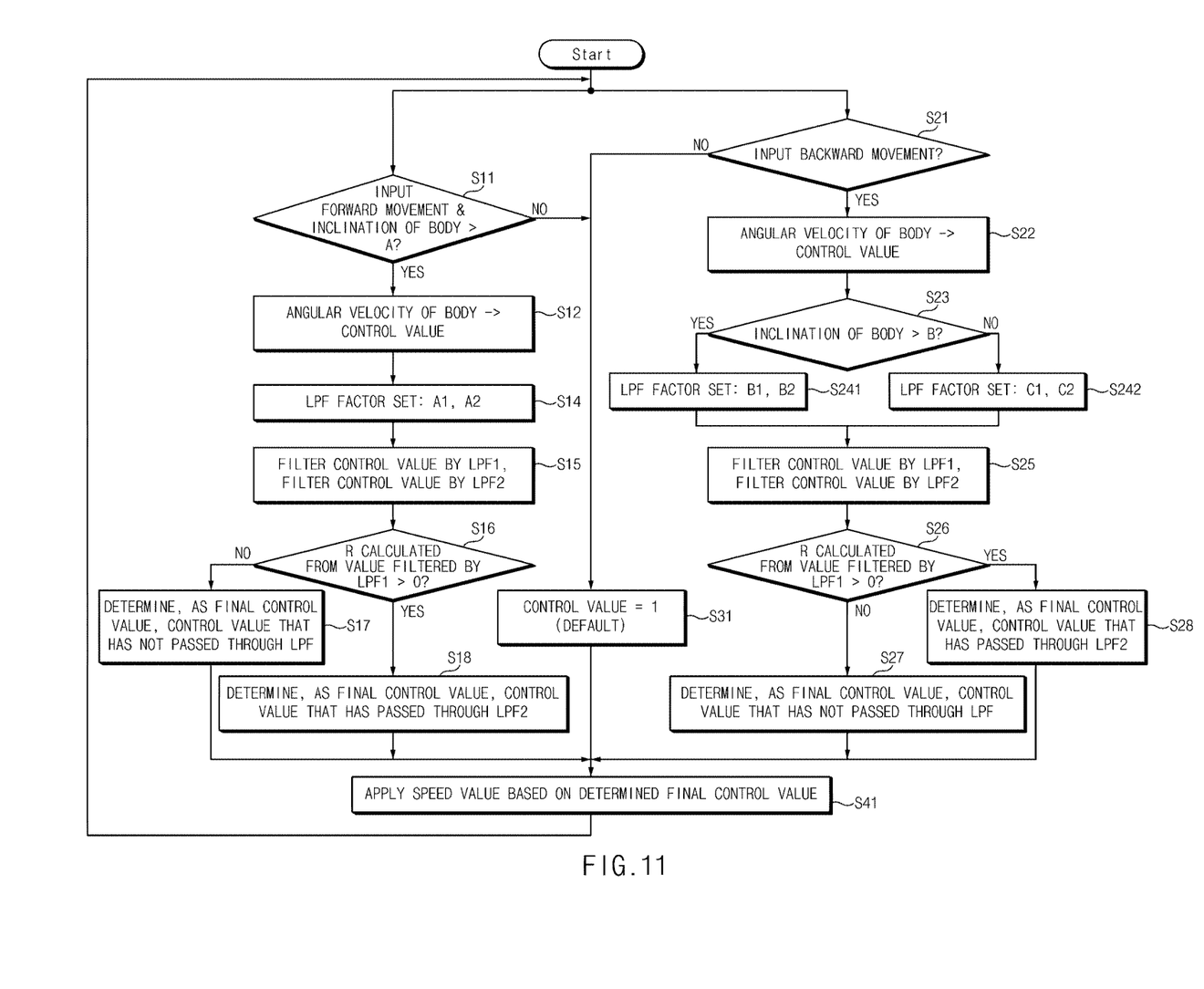
FIG. 11 is a flowchart of a method for controlling a mobile body according to an exemplary implementation of the present disclosure.

FIG. 11 is a flowchart of a method for controlling a mobile body 1 according to an exemplary implementation of the present disclosure.

A control method for the mobile body 1 according to an exemplary implementation of the present disclosure is described below with reference to FIG. 11.

The control method for the mobile body 1 according to an exemplary implementation of the present disclosure may include acquiring an inclination of a body 10 to a ground G. The control method may include calculating an angular velocity of the body 10 from the inclination of the body 10 to the ground G.

The control method may include inputting a forward movement signal and checking whether the inclination of the body 10 is greater than A that represents a certain forward movement inclination threshold (S11). The control method may include setting a final control value to 1, which is a default control value, when the forward movement signal is input but the inclination of the body 10 does not satisfy the above-described condition (S31). When the final control value is determined, the control method may include rotating a wheel 20 according to a speed value based on the final control value (S41).

The control method may include rotating a front wheel 21 at a speed based on a control value corresponding to the angular velocity of the body 10 when the forward movement signal is input and the inclination of the body 10 to the ground G is greater than the forward movement inclination threshold. In at least a range, as the angular velocity of the body 10 increases, the control value corresponding to the angular velocity of the body 10 may decrease. The angular velocity of the body 10 and the control value corresponding to the angular velocity of the body 10 may have a linear correlation.

Specifically, the control method may include computing a control value corresponding to the angular velocity of the body 10 when the forward movement signal is input and the inclination of the body 10 satisfies the above-described condition (S12). The control method may include computing the control value and then respectively setting attenuation frequencies of a noise-elimination low-pass filter and a flattening low-pass filter to A1 and A2 (S14).

The control method may include filtering the control value through each of the low-pass filters according to the set attenuation frequencies (S15). LPF1 in the drawing may represent the noise-elimination low-pass filter, and LPF2 may represent the flattening low-pass filter.

The control method may include calculating a rate of change of the control value over time. Specifically, the control method may include calculating a rate of change of the control value, which has passed through the noise-elimination low-pass filter, and checking whether the rate of change is greater than 0 (S16). The control method may include determining the control value, which has not passed through the flattening low-pass filter, as a final control value when the rate of change is not greater than 0 (S17). The control method may include determining the control value, which has passed through the flattening low-pass filter, as a final control value (S18).

In other words, the rotating of the front wheel 21 may include passing the control value through the flattening low-pass filter and rotating the front wheel 21 at a speed based on a value that has passed through the flattening low-pass filter when the calculated rate of change is greater than 0.

Also, when the calculated rate of change is less than or equal to 0, the rotating of the front wheel 21 may include rotating the front wheel 21 at a speed based on a control value that has not passed through the flattening low-pass filter.

The control method may include checking whether a backward movement signal is input (S21). When the backward movement signal is input, the control method may include rotating a rear wheel 22 at a speed based on a control value corresponding to an angular velocity of the body 10. In at least a range, as the angular velocity of the body 10 increases, the control value corresponding to the angular velocity of the body 10 may decrease. The angular velocity of the body 10 and the control value corresponding to the angular velocity of the body 10 may have a linear correlation.

Specifically, the control method includes computing a control value corresponding to the angular velocity of the body 10 when the backward movement signal is input (S22). The control method may include checking whether the inclination of the body 10 is greater than B that represents a certain backward movement inclination threshold (S23). When the inclination of the body 10 is greater than B, the control method may include respectively setting attenuation frequencies of a noise-elimination low-pass filter and a flattening low-pass filter to B1 and B2 (S241). When the inclination of the body 10 is less than or equal to B, the control method may include respectively setting attenuation frequencies of the noise-elimination low-pass filter and the flattening low-pass filter to C1 and C2 (S242).

B1 and C1 may be different from each other. A1 may be different from or equal to B1. A1 may be different from or equal to C1. B2 and C2 may be different from each other. A2 may be different from or equal to B2. A2 may be different from or equal to C2.

The control method may include filtering the control value through each of the low-pass filters according to the set attenuation frequencies (S25).

The control method may include calculating a rate of change of the control value over time. Specifically, the control method may include calculating a rate of change of the control value, which has passed through the noise-elimination low-pass filter, and checking whether the rate of change is greater than 0 (S26). The control method may include determining the control value, which has not passed through the flattening low-pass filter, as a final control value when the rate of change is not greater than 0 (S27). The control method may include determining the control value, which has passed through the flattening low-pass filter, as a final control value (S28).

In other words, the rotating of the rear wheel 22 may include passing the control value through the flattening low-pass filter and rotating the rear wheel 22 at a speed based on a value that has passed through the flattening low-pass filter when the calculated rate of change is greater than 0.

Also, when the calculated rate of change is less than or equal to 0, the rotating of the rear wheel 22 may include rotating the rear wheel 22 at a speed based on a control value that has not passed through the flattening low-pass filter.

Accordingly, the mobile body may not collide strongly with stairs when moving along the stairs.

Even though all the components constituting an exemplary implementation of the present disclosure have been described as being combined as one body or operating in combination, the present disclosure is not necessarily limited to the exemplary implementation. That is, within the scope of the objectives of the present disclosure, all the components may be selectively combined into one or more and then operated. Also, terms such as "include," "constitute," or "have" described above may mean that the corresponding components may be included unless explicitly described to the contrary, and thus should be construed as further including other components rather than excluding other components. Unless otherwise defined, all terms including technical or scientific terms have the same meanings as those generally understood by a person skilled in the art to which the present disclosure pertains. Terms used generally, such as terms defined in dictionaries, should be interpreted as having the same meaning as in an associated technical context, and should not be understood abnormally or as having an excessively formal meaning unless defined apparently in the present disclosure.

The technical ideas of the present disclosure have been described merely for illustrative purposes, and those skilled in the art appreciate that various changes and modifications are possible without departing from the essential features of the present disclosure. Therefore, the exemplary implementations of the present disclosure are to be considered illustrative and not restrictive, and the technical idea of the present disclosure is not limited to the foregoing implementations. The protective scope of the present disclosure is defined by the appended claims, and all technical ideas within their equivalents should be interpreted as being included in the scope of the present disclosure.

What is claimed is:

1. A mobile body comprising:
   a body;
   a front wheel coupled to a front side of the body and configured to rotate relative to the body;
   a rear wheel coupled to a rear side of the body and configured to rotate relative to the body;
   a front wheel driver coupled to the body and the front wheel and configured to transmit a front driving force to the front wheel;
   a rear wheel driver coupled to the body and the rear wheel and configured to transmit a rear driving force to the rear wheel;
   a body angle detector disposed at the body and configured to acquire a body angle at which the body is tilted relative to a ground; and
   a processor connected to the body angle detector, the front wheel driver, and the rear wheel driver,
   wherein the processor is configured to, based on receiving a forward movement signal, control the front wheel driver to rotate the front wheel at a first speed based on the body angle being greater than a forward movement inclination threshold, the first speed being determined based on a control value corresponding to an angular velocity of the body calculated from information acquired by the body angle detector, and
   wherein the control value corresponding to the angular velocity of the body decreases based on the angular velocity of the body increasing.

2. The mobile body of claim 1, wherein the processor is configured to calculate a rate of change of the control value over time and control the front wheel driver to thereby cause the front wheel to rotate, based on the calculated rate of change being greater than 0, at a speed that is determined based on a value obtained by processing the control value through a flattening low-pass filter.

3. The mobile body of claim 2, wherein the processor is configured to calculate the rate of change by using a value obtained by processing the control value through a noise-elimination low-pass filter.

4. The mobile body of claim 2, wherein the processor is configured to, based on the calculated rate of change being less than or equal to 0, control the front wheel driver to thereby rotate the front wheel at a speed based on a control value that has not been processed through the flattening low-pass filter.

5. The mobile body of claim 1, wherein the angular velocity of the body and the control value corresponding to the angular velocity of the body have a linear correlation with each other.

6. The mobile body of claim 1, wherein, the processor is configured to, based on receiving a backward movement signal, control the rear wheel driver to rotate the rear wheel at a speed based on a control value corresponding to an angular velocity of the body.

7. The mobile body of claim 6, wherein the processor calculates a rate of change of the control value over time and controls the rear wheel driver to thereby cause the rear wheel to rotate, based on the calculated rate of change being greater than 0, at a speed that corresponds to a value obtained by processing the control value through a flattening low-pass filter.

8. The mobile body of claim 7, wherein a first degree to which the flattening low-pass filter attenuates the control value based on the body angle calculated from information obtained by the body angle detector being greater than a backward movement inclination threshold, is greater than a second degree to which the flattening low-pass filter attenuates the control value based on the body angle being less than or equal to the backward movement inclination threshold.

9. The mobile body of claim 7, wherein the processor is configured to calculate the rate of change by using a value obtained by processing the control value through a noise-elimination low-pass filter.

10. The mobile body of claim 7, wherein the processor is configured to, based on the calculated rate of change being less than or equal to 0, control the rear wheel driver to rotate the rear wheel at a speed that is determined based on a control value that has not been processed through the flattening low-pass filter.

11. A method for controlling a mobile body, wherein the mobile body includes a body, a front wheel coupled to a front side of the body and configured to rotate relative to the body, and a rear wheel coupled to a rear side of the body and configured to rotate relative to the body, the method comprising:
acquiring a body angle relative to a ground;
calculating an angular velocity of the body from the body angle; and
rotating the front wheel at a speed based on a control value corresponding to the angular velocity of the body based on (i) a forward movement signal being input and (ii) the body angle being greater than a forward movement inclination threshold,
wherein the control value corresponding to the angular velocity of the body decreases based on the angular velocity of the body increasing.

12. The method of claim 11, further comprising calculating a rate of change of the control value over time, wherein the rotating of the front wheel comprises:
processing the control value through a flattening low-pass filter, and
rotating the front wheel at a speed based on a value that has been processed through the flattening low-pass filter based on the calculated rate of change being greater than 0.

13. The method of claim 12, wherein the calculating of the rate of change comprises calculating a rate of change of a value obtained by processing the control value through a noise-elimination low-pass filter.

14. The method of claim 12, wherein the rotating of the front wheel comprises:
based on the calculated rate of change being less than or equal to 0, rotating the front wheel at a speed based on a control value that has not been processed through the flattening low-pass filter.

15. The method of claim 11, wherein the angular velocity of the body and the control value corresponding to the angular velocity of the body have a linear correlation with each other.

16. The method of claim 11, further comprising rotating the rear wheel at a speed based on the control value based on a backward movement signal being input.

17. The method of claim 16, further comprising calculating a rate of change of the control value over time, wherein the rotating of the rear wheel comprises:
processing the control value through a flattening low-pass filter, and
rotating the rear wheel at a speed based on a value that has been processed through the flattening low-pass filter based on the calculated rate of change being greater than 0.

18. The method of claim 17, wherein a first degree to which the flattening low-pass filter attenuates the control value based on the body angle being greater than a backward movement inclination threshold, is greater than a second degree to which the flattening low-pass filter attenuates the control value based on the body angle being less than or equal to the backward movement inclination threshold.

19. The method of claim 17, wherein the calculating of the rate of change comprises calculating a rate of change of a value obtained by processing the control value through a noise-elimination low-pass filter.

20. The method of claim 17, wherein the rotating of the rear wheel comprises:
based on the calculated rate of change being less than or equal to 0, rotating the rear wheel at a speed based on a control value that has not been processed through the flattening low-pass filter.

* * * * *

UNITED STATES PATENT AND TRADEMARK OFFICE
CERTIFICATE OF CORRECTION

Page 1 of 1

| | |
|---|---|
| PATENT NO. | : 12,372,973 B2 |
| APPLICATION NO. | : 18/451413 |
| DATED | : July 29, 2025 |
| INVENTOR(S) | : Hoon Chung, Jin Choi and Sun Myoung Jo |

It is certified that error appears in the above-identified patent and that said Letters Patent is hereby corrected as shown below:

On the Title Page

Item (73) Assignees should read: -- Hyundai Motor Company, Seoul (KR); Kia Corporation, Seoul (KR); MOBINN Inc., Seoul (KR) --

Signed and Sealed this
Twenty-eighth Day of October, 2025

John A. Squires
*Director of the United States Patent and Trademark Office*